Aug. 13, 1968   P. B. ZEIGLER ET AL   3,396,600
POWER OPERATED TILT AND TELESCOPE STEERING ASSEMBLY
Filed Oct. 11, 1966   3 Sheets-Sheet 1
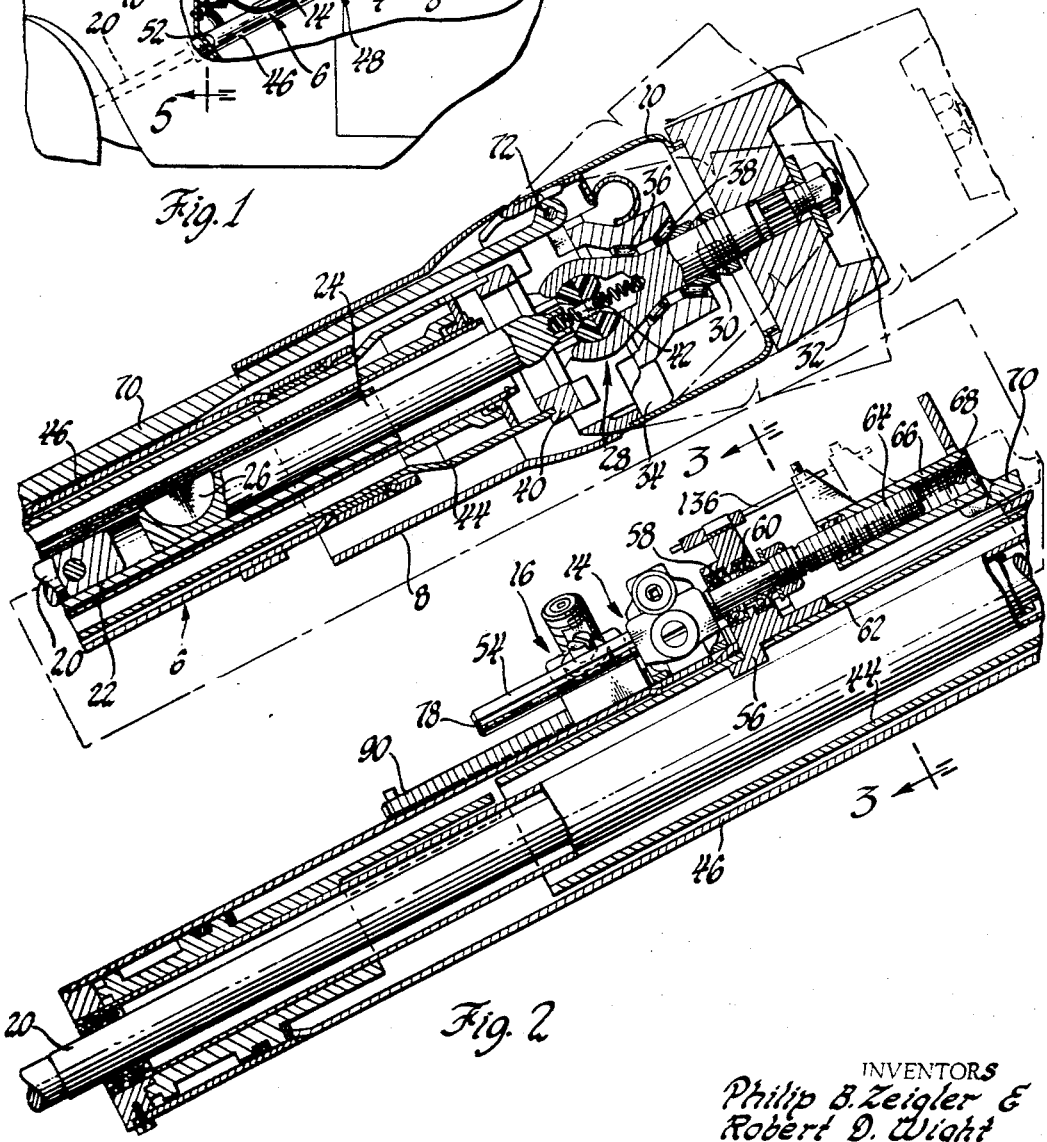
INVENTORS
Philip B. Zeigler &
Robert D. Wight
W. F. Wagner
ATTORNEY Aug. 13, 1968     P. B. ZEIGLER ETAL     3,396,600
POWER OPERATED TILT AND TELESCOPE STEERING ASSEMBLY
Filed Oct. 11, 1966                     3 Sheets-Sheet 2

INVENTORS
Philip B. Zeigler &
Robert D. Wight

W. F. Wagner
ATTORNEY

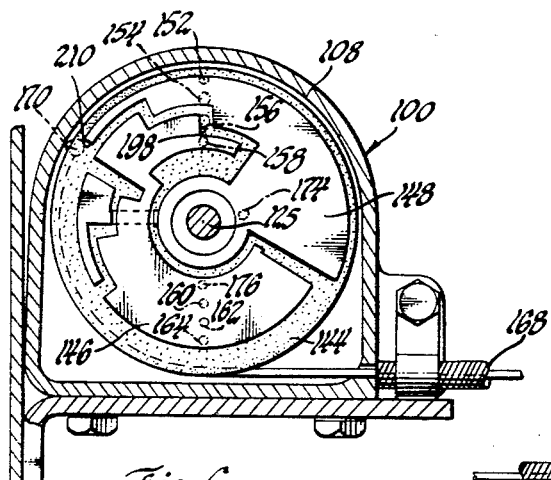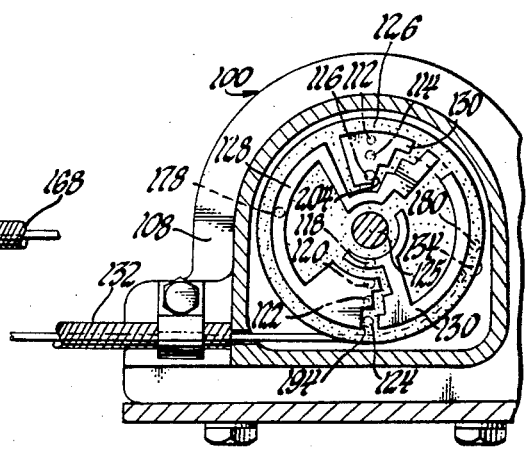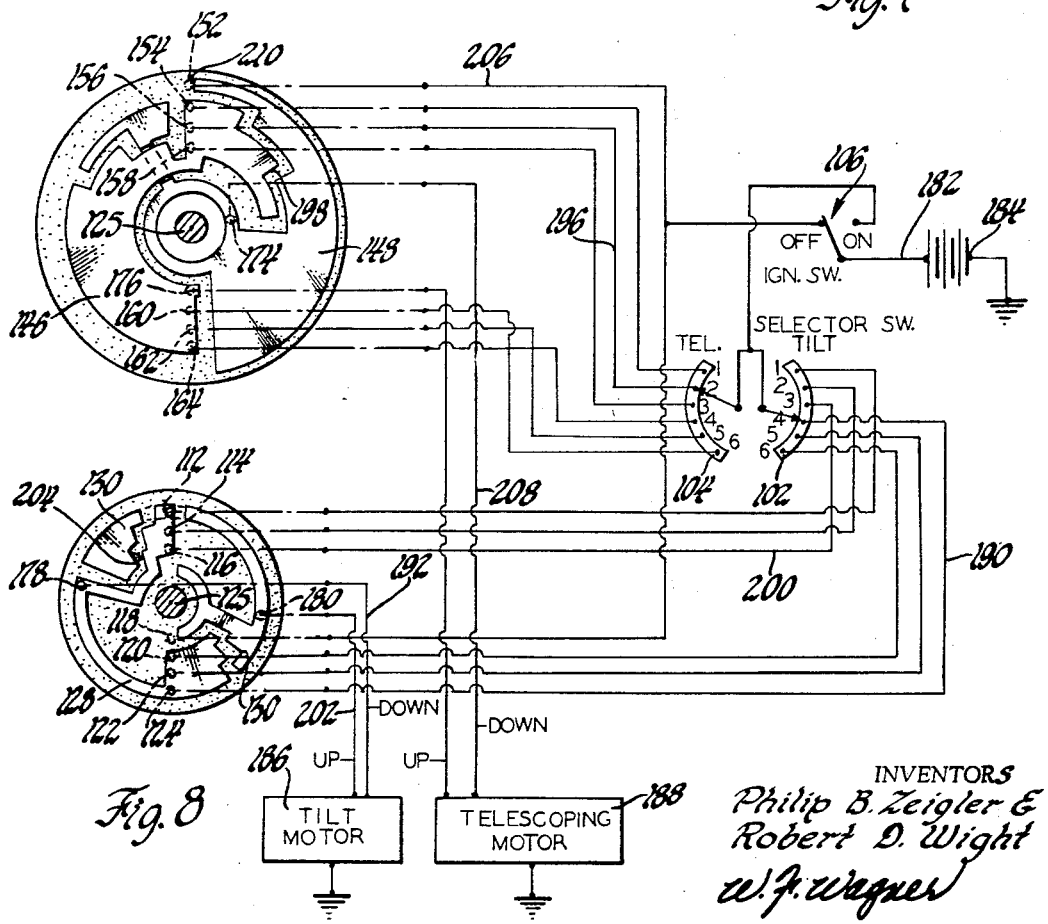

United States Patent Office 3,396,600
Patented Aug. 13, 1968

3,396,600
POWER OPERATED TILT AND TELESCOPE
STEERING ASSEMBLY
Philip B. Zeigler and Robert D. Wight, Saginaw, Mich., assignors to General Motors Corporation, Detroit, Mich., a corporation of Delaware
Filed Oct. 11, 1966, Ser. No. 585,811
5 Claims. (Cl. 74—493)

This invention relates to adjustable steering assemblies and more particularly to steering assemblies having power operated tilting and telescoping mechanism enabling remote control of the axial and angular position of the steering wheel.

An object of the invention is to provide an improved tilt and telescope steering assembly for vehicles.

Another object is to provide a tilt and telescope steering assembly in which adjustments are accomplished by remotely controlled power operated reversible drive means.

A further object is to provide a power operated tilt and telescope steering assembly wherein separate drive means for imparting tilting and telescoping movement respectively are mounted in a fixed position on a fixed portion of the assembly.

A still further object is to provide a power operated tilt and telescope steering assembly including means for preselecting angular and telescoped positions.

Still another object is to provide an arrangement of the type described including means for automatically displacing the adjustable assembly to its maximum limit of tilting and telescoping movement when the vehicle is rendered inoperative and to automatically restore the preselected angular and telescoped position when vehicle operation is resumed.

These and other objects, advantages and features of the invention will become more readily apparent as reference is had to the accompanying specification and drawings wherein:

FIGURE 1 is a fragmentary view, partly in section and with parts broken away, illustrating the environment and general arrangement of a steering assembly in accordance with the invention;

FIGURE 2 is an enlarged sectional side elevational view illustrating the details of mechanical construction of the steering assembly;

FIGURE 6 is a view looking in the direction of arrows 6—6 of FIGURE 5;

FIGURE 7 is a view looking in the direction of arrows 7—7 of FIGURE 5; and

FIGURE 8 is a schematic diagram of the electrical circuit for energizing the mechanism.

Figure 3:
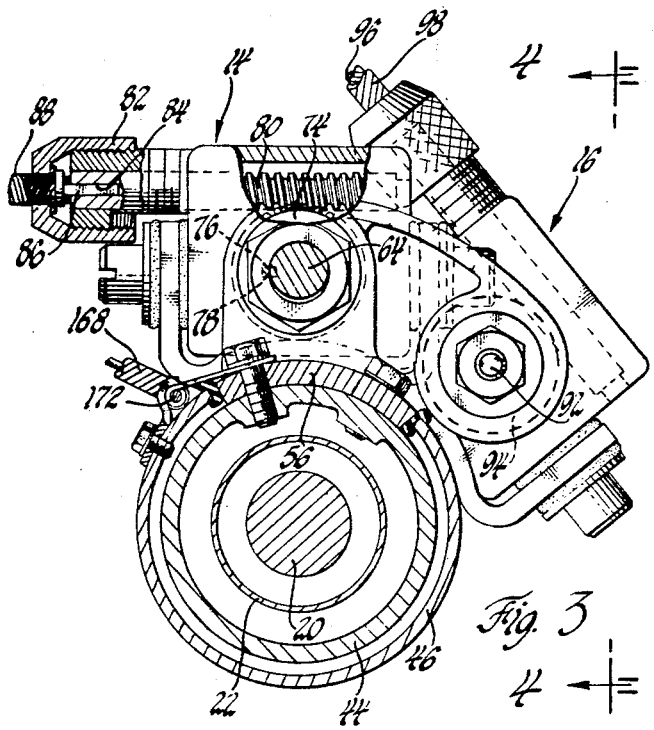
FIGURE 3 is a view looking in the direction of arrows 3—3 of FIGURE 2.

Referring now to the drawings and particularly FIGURE 1, the reference numeral 2 generally designates a vehicle body within which a steering assembly 4 is disposed in a conventional position. Assembly 4 comprises a fixed lower portion 6, an intermediate portion 8 adapted for axial displacement relative to portion 6, and an upper portion 10 adapted for angular displacement about a transverse axis relative to intermediate portion 8, thus enabling the vehicle operator to adjust the angular and fore and aft position of the steering wheel 12 for greatest convenience and ease of operation. In order to enhance ease and accuracy of operator selection of steering wheel inclination and fore and aft position, the structure illustrated in FIGURE 1 includes reversibly driven power actuators 14 and 16 which are respectively operable by control means located at any convenient remote location to accomplish such adjustments by smooth steady translation throughout predetermined angular and linear ranges. Additionally, the control means for power actuators 14 and 16 incorporate a follower mechanism 18 which in conjunction with electrical circuitry to be described hereinafter enables preselection of the desired angular and telescoped positions of steering wheel 12, automatic displacement of the wheel to its maximum inward telescoped position and upward tilted position during periods when the operator is entering and leaving the vehicle, and automatic return to the preselected position when vehicle operation is resumed.

Figure 4:
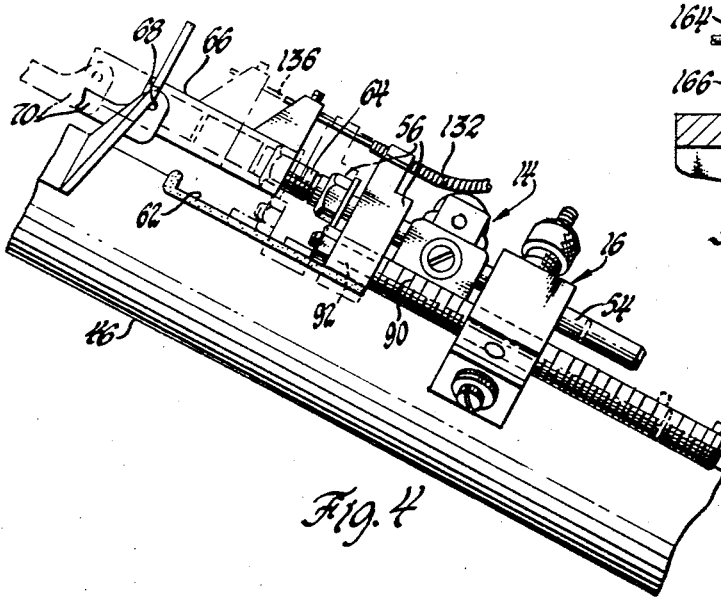
FIGURE 4 is a fragmentary side elevational view looking in the direction of arrows 4—4 of FIGURE 3.

In order to accomplish certain of the foregoing mechanical operations in accordance with the invention, as seen best in FIGURES 2, 3 and 4, steering assembly 4 includes a lower steering shaft 20 (the lower end of which is connected to a conventional steering gear box, not shown) having tubular portion 22 secured at the upper end thereof and axially slidably embracing an intermediate steering shaft 24. A Woodruff key 26 interconnects tubular portion 22 with intermediate shaft 24 to maintain rotary engagement while enabling relative axial movement. The upper end of shaft 24 forms one half of a crossed yoke and split ball type universal joint 28, while the other half of joint 28 is formed at the lower end of steering stub shaft 30. The upper end of stub shaft 30 in turn is secured to the hub portion 32 of steering wheel 12. In order to permit angular adjustment of the axis of rotation of stub shaft 30 while maintaining rotational driving engagement with intermediate shaft 24 and lower shaft 20, the lower portion of stub shaft 30 is rotatably mounted in a cylindrical housing 34 by opposed thrust bearings 36 and 38. Housing 34 in turn is pivotally mounted on a support 40 for angular movement on a transverse axis (not shown) coinciding with the geometric center 42 of universal joint 28. Support 40 in turn is secured at the upper end of a tubular jacket 44 which surrounds intermediate steering shaft 24 and tubular member 22. Tubular jacket 44 extends downwardly in telescoping relation within a second tubular jacket 46 which is supported near its upper end in the vehicle body by a bracket 48 depending from the instrument panel 50. The lower end of jacket 46 in turn passes through and is supported in the fire wall 52. As thus far described, it will be seen that steering wheel 12, hub portion 32 and housing 34 (upper portion 10) are angularly movable relative to support 40 and tubular jacket 44 (intermediate portion 8), while both are axially movable relative to fixed jacket 46 (lower portion 6).

In order to accomplish precision adjustment of both the axial and angular positions of adjustment in accordance with the invention, jacket 46 has fixedly mounted thereon a pair of remotely driven worm and gear type actuators 14 and 16. Actuator 14 drivingly engages a shaft 54 which is rotatably supported in a shoe 56 by a pair of thrust bearings 58 and 60. Shoe 56 is secured to tubular jacket 44 and extends outwardly through a rectangular slot 62 formed in fixed jacket 46. Actually upwardly of thrust bearing 60, shaft 54 is provided with a threaded portion 64 which threadably engages an internally threaded sleeve member 66 which in turn is connected by a pivot pin 68 to a link or rod 70. Link 70 extends upwardly into housing 34 to which it is connected by pivot pin 72. Since pivot 72 is radially displaced from the geometric center 42 of universal joint 28, linear movement of link 70 causes steering wheel 12 and hub 32 to describe an angular path as indicated in dotted lines. Hence, when shaft 54 is rotated by operation of actuator 14, the threaded portion 64 rotating therewith causes sleeve member 66 to traverse linearly relative to shoe 56, and thus imparts the necessary linear movement to link 70.

As seen best in FIGURE 4, rotation of shaft 54 is accomplished by a worm and gear drive mounted in the housing of actuator 14. Gear 74 surrounds shaft 54 and is provided with a key 76 which tracks in a longitudinal keyway 78 in the shaft. Worm 80 in turn operatively engages gear 74 and is provided with an end portion 82 having a drive aperture 84 formed therein adapted to receive the driving end of a flexible drive cable 86. Cable 86 is surrounded by a cable sheath 88 and extends outwardly therewith for connection with a conventional reversible electric motor, not shown. It will, of course, be evident that angular displacement of steering wheel 12 to the maximum limit in one direction is accomplished by continuous operation of the reversible motor in one direction until the threaded portion 64 of shaft 54 has extended sleeve member 66 to its maximum limit of linear displacement in one direction while continuous operation of the motor in the opposite direction will cause a reverse action displacing the steering wheel to its maximum angular position in the other direction. Similarly, any of an infinite number of positions within such range of movement may be achieved by operating the motor until the desired angle of inclination is reached. Upon cessation of operation of the motor, the shaft 54 is restrained against rotary movement by the stationary worm 80 and thereby positively locks the steering wheel in the desired angular position.

Actuator 16 in turn drivingly engages a threaded shaft 90, the upper end 92 of which extends into and is locked to shoe 56. Unlike actuator 14, actuator 16 does not impart rotation to shaft 90 but rather drives a thrust stabilized gear 94 having an internally threaded portion (not shown) which threadably engages shaft 90. Hence, when gear 94 revolves within the housing of actuator 16, shaft 90 moves linearly relative to actuator housing 16 causing shoe 56 to be displaced linearly relative to the actuator housing. Since shoe 56 is secured to tubular jacket 44, such displacement of shoe 56 causes corresponding linear displacement of jacket 44 and support 40 relative to the fixed jacket 46 and thus progressively changes the axial position of the intermediate and upper portions of the assembly relative to the lower portion. It will be understood that actuator 16 is operatively connected to a second reversible electric motor, also not shown, by a flexible drive shaft and sheath 96 and 98 in the same manner described with respect to actuator 14 and reversible operation of the motor will cause corresponding reversal in telescoping adjustment of the steering assembly.

It is to be particularly noted that an arrangement in accordance with the present invention enables mounting of both actuators in fixed positions on the lower tubular jacket 46 even though the distance between the pivotal connection 68 on link 70 and actuator 14 changes with each change in the telescoping adjustment effected by actuator 16. Thus by virtue of the sliding spline connection between gear 74 of actuator 14 and shaft 54, such change in position is accommodated without altering the distance between shoe 56 and pivot connection 68, which distance is the determining factor in establishing and maintaining the angular position of the steering wheel.

Figure 5:
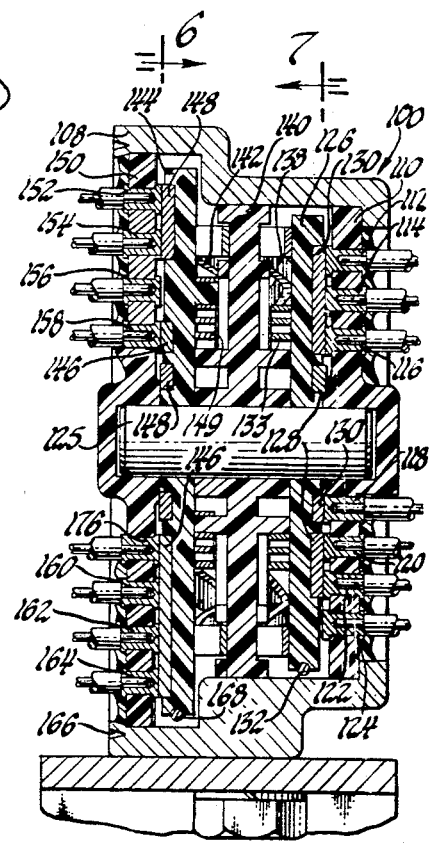
FIGURE 5 is a sectional view of the control device utilized to accomplish preselection of angular and telescoped positions of adjustment, automatic displacement therefrom, and restoration to the preselected positions.

Turning now to the control and automatic operational features of the invention, as seen best in FIGURES 5, 6 and 7, there is shown an electromechanical memory device 100 which is operatively connected for synchronous mechanical movement relative to the telescoping intermediate portion 8 and tilting upper portion 10 and in electrical relationship with a tilt and telescope selector switch 102–104 and vehicle ignition switch 106 so that selection of any given selector position for each function will result in energizing appropriate circuits to the related actuator to accomplish telescoping and tilting movement. In the illustrated embodiment, the memory device permits selection of any of six positions for both the tilting and telescoping functions of the steering column. To facilitate exit and entry of the vehicle, the ignition switch and memory device are so interconnected electrically that when the ignition switch is turned to the "Off" position the steering column will telescope to the all-the-way down position and tilt to the all-the-way up position. However, when the ignition switch is restored to the "On" position by the operator after having entered the vehicle, the steering column will automatically return to the respective preselected tilt and telescope positions of adjustment.

Referring now particularly to FIGURE 5, memory device 100 comprises a stepped cylindrical housing 108 within which is disposed a fixed dielectric plate 110 having a plurality of contact brushes 112, 114, 116, 118, 120, 122 and 124 embedded therein. Rotatably supported on a bearing pin 125 in axially juxtaposed relation with dielectric 110 is a dielectric element 126 having advance and return contact plates 128 and 130 embedded therein which axially abut the contact and collector brushes of dielectric 110. Dielectric element 126 is connected for synchronous movement with sleeve 66 by means of a Bowden cable 132 (FIGURE 3). As seen in FIGURE 7, one end of cable 132 extends into housing 108 and tracks partially about the circumference of dielectric 126 and is connected thereto by a ball end 134 recessed in a corresponding socket in the dielectric. Consequently, when the other end 136 (FIGURE 4) of Bowden cable 132 attached to sleeve 66 moves linearly therewith, dielectric 126 is caused to rotate about pin 125 in predetermined synchronous angular relation. Disposed in axially abutting relation to dielectric 126 is a wave washer 138 which reacts with a central separator plate 140 to establish a preload on dielectrics 126 and 110 sufficient to assure ample wiping contact between the contact plates and brushes. A similar wave washer 142 disposed on the opposite side of separator 140 in turn exerts a corresponding preload on a second rotatably mounted dielectric plate 144 which carries embedded advance and return contact plates 146 and 148. A second fixed dielectric 150 faces dielectric 144 and has embedded therein contact brushes 152, 154, 156, 158, 160, 162 and 164. Dielectric 150 is retained in position and supports the adjacent end of pin 125 by staking the inner margin 166 of housing 108 and thus secures the entire assembly in operating engagement. Rotatable dielectric 144 is connected for synchronous movement with shoe 56 by means of a Bowden cable 168. As seen in FIGURE 6, one end of cable 168 extends into housing 108 and tracks partially about the circumference of dielectric element 144 and is connected thereto by a ball end 170 recessed in a corresponding socket in the dielectric. Consequently, when the other end 172 of Bowden cable 168 attached to shoe 56 moves linearly, the dielectric 144 is caused to rotate with predetermined synchronous movement.

Referring now to FIGURES 6, 7 and 8, it will be seen that the advance contact plates and return contact plates of dielectrics 126 and 144 define radially and circumferentially stepped patterns in plan which are so interrelated with the fixed positions of the associated contact brushes and collector brushes (174–176 of FIGURE 6 and 178–180 of FIGURE 7) as to produce a progressive pattern of energization and automatic deenergization upon rotation of the contact plates incident to telescoping or tilting movement of the associated mechanical portion of the adjustable steering assembly. In order that operation of the device may be more clearly understood, the orientation of the rotating dielectrics are shown in FIGURES 6 and 7 in the positions assumed when the steering mechanism is telescoped upwardly to the position established by setting the telescope selector in the No. 2 position and tilted to the position established when the tilt selector is set in the No. 4 position. For comparison purposes, the rotating dielectric elements are shown in conjunction with the circuit diagram of FIGURE 8 in the positions occupied when the steering assembly is telescoped to the all-the-way down position and tilted to the all-the-way-up position as a result of positioning the ignition switch in the "Off" position which, as previously stated, energizes the circuit bypassing the selector switch and causing maximum inward telescoping and upward tilting.

By reference to the position of the ignition switch illustrated in FIGURE 8, it will be apparent that the electrical conductor 182 leading from the source of energy 184 to either the tilt motor 186 or telescoping motor 188 does not establish a complete circuit due to the fact that contact brush 118 in plate 110 and contact brush 152 in plate 150 do not engage either of their respective return contact plates. Therefore, during the period in which the vehicle is inoperative, the adjustable column occupies the fully downwardly telescoped and fully upwardly tilted position. However, when the ignition switch is turned to the "On" position, the conductor 182 is disconnected from the circuit leading directly to either brush 152 or 118 and connected to telescope and tilt selector switch 102–104 from which, depending upon the number selection for each mode, current passes to the related contact brushes in fixed dielectrics 110 and 150. In FIGURE 8, for purposes of illustration, the tilt and telescope selector switches are shown in positions 4 and 2, respectively, which result in adjustment of the steering column to positions correlated with the angular positions of rotary dielectrics 126 and 144 shown in FIGURES 7 and 6, respectively. Hence, when the ignition switch is placed in the "On" position, current passes to the tilt dial selector 102, moves along conductor 190 to brush contact 124 which abuttingly engages advance contact plate 128, which plate in turn engages collector brush 178 attached to conductor 192 leading to one set of field windings of the tilting motor, thereby energizing the latter causing it to rotate the cable drive 86 and angularly displace the upper portion 10 of the steering column downwardly relative to the intermediate portion 8. As upper portion 10 tilts downwarly, the advance contact plate 128 moves clockwise as seen in FIGURE 7 under the influence of Bowden cable 132 until the edge 194 of advance contact plate 128 loses contact with brush contact 124. At this point, the circuit to the tilt motor 186 is broken and the steering assembly thereafter remains in a selected position of adjustment. Coincidental with the described tilt operation, current from conductor 182 also passes through telescope selector position No. 2 via conductor 196 to contact brush 156 in fixed dielectric 150. Since brush 156 bears against advance contact plate 146, current passes along the latter to collector brush 176 and energizes one set of field windings of the telescoping motor 188 causing the latter to rotate the cable drive 96 and displace the intermediate portion 8 of the steering assembly upwardly relative to fixed portion 6. As the steering wheel 12 moves upwardly, advance contact plate 146 moves counterclockwise, as seen in FIGURE 6, under the influence of Bowden cable 168 until the edge 198 loses contact with contact brush 156. At this point, the circuit to the telescope motor is broken and the steering assembly thereafter remains in the selected telescoped position of adjustment as long as the ignition switch remains in the "On" position.

From examination of the stepped or notched configuration of the end of advance contact plates 128 and 146, it will be apparent that as each selector switch 102–104 is repositioned successively to a higher numbered position of the indicated six positions of adjustment, a different one of contact brushes 112, 114, 116, 118, 120, 122, 124 and 152, 154, 156, 158, 160, 162, 164 will be brought into the respective circuit which requires further angular movement of the advance contact plates before deenergization of the circuit of the respective motors occurs. Similarly, successive repositioning of switch 102– 104 from the higher number positions to the lower number positions causes a different one of the indicated contact brushes to cooperate with return contact plates 130 and 148, which due to similarly stepped or notched configurations at their ends induce reverse angular movement before deenergization of the circuit to the respective motors occurs. By way of example, if the tilt selector switch 102 is reset to position 3 subsequent to the original position 4, it will be seen that current will pass along conductor 200 to contact brush 116. Since brush 116 bears against return contact plate 130, which plate in turn engages collector brush 180, the latter energizes the other set of field windings of the tilting motor via conductor 202 thereby causing the latter to rotate cable drive 86 and angularly displace the upper portion 10 of the steering column upwardly relative to the intermediate portion. As the upper portion 10 tilts upwardly, the return contact plate 130 moves counterclockwise as seen in FIGURE 7 under the influence of Bowden cable 132 and coiled leaf return spring 133 until the edge 204 of return contact plate 130 loses contact with brush contact 116. At this point, the circuit to the tilt motor 186 is again broken and the steering assembly thereafter remains in the newly selected position of adjustment. It will be apparent that a similar return function results from the stepped notches associated with the end of return contact plate 148 for the telescoping mode.

In addition to the selective sequential positioning of the tilting and telescoping modes, return contact plates 130 and 148 are so arranged in relation to brush contacts 118 and 152, respectively, that irrespective of the selected position of adjustment effective while the ignition switch is on, both the tilting and telescoping positions of the steering assembly will be automatically displaced to the fully downwardly telescoped and fully upwardly tilted positions when the ignition switch is in the "Off" position. Thus, if return contact plate 148 is in the position shown in FIGURE 6 for a given selected position of adjustment, upon movement of the ignition switch to the "Off" position, the contact brush 152 is energized via conductor 206. Since brush 152 bears against return contact plate 148 which in turn engages collector brush 174 leading to the conductor 208, the other set of field windings of telescoping motor 188 will be energized causing the intermediate portion of the steering assembly to telescope downwardly. As downward telescoping movement takes place, return contact plate 148 is rotated clockwise as seen in FIGURE 6 by Bowden cable 168 and coiled leaf return spring 149 until the notched end 210 loses contact with brush 152. Since this position of angular orientation is correlated with the fully downwardly telescoped position, the steering assembly will invariably be returned to the fully downwardly telescoped position whenever the ignition switch is in the "Off" position irrespective of the selected position effective while the ignition switch is in the "On" position. From a comparison of the relative positions of the return contact plate 130 in FIGURES 7 and 8, it will be evident that fully upward movement of the tilting portion of the assembly will occur due to energization of the conductor 202 by brush contact 118.

While but one embodiment of the invention has been shown and described, it will be apparent that other changes and modifications may be made therein. It is, therefore, to be understood that it is not intended to limit the invention to the embodiment shown, but only by the scope of the claims which follow.

We claim:

1. In a steering assembly having a fixed lower portion, an intermediate portion telescopeable relative to said lower portion and an upper portion tiltable relative to said intermediate portion, the combination comprising, first power operated means mounted on said lower portion and connected to said intermediate portion for axially moving said intermediate portion to any selected position within a predetermined linear range, second power operated means mounted on said lower portion for tiltably moving said upper portion to any selected position within a predetermined angular range, said second power operated means including slidable drive means operatively connected to said upper portion and permitting axial displacement of said upper portion with said intermediate portion relative to said lower portion while maintaining the selected angular position relative to said intermediate portion.

2. The structure set forth in claim 1 including a steering wheel rotatably mounted on said upper portion, said wheel being secured to a segmented steering shaft having a universal joint connection located on the tilting axis of said upper portion.

3. In a steering assembly having a fixed lower portion, an intermediate portion telescopeable relative to said lower portion and an upper portion tiltable relative to said intermediate portion about a transverse axis, the combination comprising, a first power operated actuator mounted on said lower portion for axially moving said intermediate portion to any selected position within a predetermined linear range, said first actuator including an axially driven lead screw fixedly secured at one end to said intermediate portion, and a second power operated actuator mounted on said lower portion for tiltably moving said upper portion to any selected position within a predetermined angular range, said second actuator including a rotatably driven lead screw fixed axially on said intermediate portion and threadably engaging a cooperating threaded member operatively connected to said upper portion, said rotatably driven lead screw further including slidable drive means permitting axial displacement thereof relative to said lower portion.

4. The structure set forth in claim 3 wherein said lead screws are secured on a common member mounted on said intermediate portion.

5. The structure set forth in claim 3 wherein said cooperating threaded member operatively engages said upper portion via a link pivoted to the latter at a point laterally displaced from said transverse axis.

References Cited

UNITED STATES PATENTS

| | | | |
|---|---|---|---|
| 3,216,521 | 11/1965 | Ulrich | 74—493 X |
| 3,245,282 | 4/1966 | Kimberlin | 74—493 |
| 3,252,350 | 5/1966 | Zeigler | 74—493 |

MILTON KAUFMAN, *Primary Examiner.*